(12) United States Patent
Patel

(10) Patent No.: US 6,957,308 B1
(45) Date of Patent: Oct. 18, 2005

(54) DRAM SUPPORTING DIFFERENT BURST-LENGTH ACCESSES WITHOUT CHANGING THE BURST LENGTH SETTING IN THE MODE REGISTER

(75) Inventor: Shwetal Patel, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 348 days.

(21) Appl. No.: 10/193,828

(22) Filed: Jul. 11, 2002

(51) Int. Cl.$^7$ ............................................. G06F 12/00
(52) U.S. Cl. ..................... 711/154; 711/105; 711/167; 710/35; 365/239
(58) Field of Search ...................... 711/105, 167, 154; 365/239, 189.07; 710/35

(56) References Cited

U.S. PATENT DOCUMENTS

| | | | |
|---|---|---|---|
| 5,754,825 A | | 5/1998 | Hausauer et al. |
| 6,205,516 B1 | * | 3/2001 | Usami ......................... 711/105 |
| 6,226,724 B1 | * | 5/2001 | Biggs .......................... 711/170 |
| 6,393,500 B1 | | 5/2002 | Thekkath |
| 6,549,991 B1 | * | 4/2003 | Huang et al. ................ 711/158 |
| 6,564,287 B1 | * | 5/2003 | Lee ............................. 711/105 |
| 6,615,325 B2 | * | 9/2003 | Mailloux et al. ............ 711/154 |
| 2001/0010096 A1 | | 7/2001 | Horton, Jr., et al. |
| 2001/0039602 A1 | * | 11/2001 | Kanda et al. ................ 711/105 |
| 2002/0031020 A1 | | 3/2002 | Ozawa et al. |
| 2003/0204674 A1 | * | 10/2003 | Ryan et al. .................. 711/137 |

OTHER PUBLICATIONS

International search report application No. PCT/US03/21286 mailed Dec. 9, 2003.

* cited by examiner

*Primary Examiner*—Gary Portka
*Assistant Examiner*—Jasmine Song
(74) *Attorney, Agent, or Firm*—Meyertons Hood Kivlin Kowert & Goetzel, P.C.; B. Noël Kivlin

(57) ABSTRACT

A memory device may be implemented to respond to and one or more command encodings that specify different burst lengths than the burst length indicated by the current burst length setting for the memory device. For example, a memory device may include a memory array and a mode register configured to store a value indicating a current burst length. The memory array may be configured to perform a first burst access having a first burst length in response to receiving a first command encoding and to perform a second burst access having a second burst length, which does not equal the current burst length, in response to receiving a second command encoding. A memory controller may be implemented to generate to and one or more command encodings that specify different burst lengths than the burst length indicated by the current burst length setting for a targeted memory device.

37 Claims, 5 Drawing Sheets

DRAM SUPPORTING DIFFERENT BURST-LENGTH ACCESSES WITHOUT CHANGING THE BURST LENGTH SETTING IN THE MODE REGISTER

BACKGROUND OF THE INVENTION

1. Field of the Invention

This invention relates to computer systems and, more particularly, to burst modes used in DRAM (Dynamic Random Access Memory).

2. Description of the Related Art

DRAM (Dynamic Random Access Memory) devices often include a mode register. A value stored in the DRAM device's mode register controls the burst length of that DRAM device. Typically, the mode register value is initialized to identify a particular burst length during initialization. A memory controller may update the value stored in the register to change the burst length setting. However, modifying the burst length setting may be a time consuming process. For example, to program the mode register, a memory controller may wait until all DRAM accesses have completed and then issue a load mode register command by activating certain command signals (e.g., /CS (Chip Select), /RAS (Row Address Strobe), /CAS (Column Address Strobe), and /WE (Write Enable)) while placing the proper op-code onto certain pins (e.g., the address and BA0 pins). After issuing the load mode register command, the memory controller may have to wait a certain number of cycles before initiating new DRAM accesses. Accordingly, changing the burst length setting in this manner may impose an undesirable performance penalty on pending accesses.

A memory controller may receive access requests that have different burst lengths. For example, AGP (Advanced Graphics Port) transactions may involve 32 byte blocks, while processor transactions may involve 64 byte blocks. In some DRAM devices, thirty-two byte block accesses may be satisfied in four bursts, while 64 byte blocks may be satisfied in eight bursts. Since the DRAM burst length is fixed by the value stored in the mode register, either bandwidth will be wasted (if burst length is set to eight and 32 byte block transactions are being performed) or the memory controller will have to reissue commands (if burst length is set to four and 64 byte block transactions are being performed) for transactions having a particular length. However, it may be even more inefficient to change the burst length in burst mode register in order to handle transactions of a particular burst length. Thus, it is desirable to be able to dynamically change the burst length on a per-access basis without having to update the mode register.

Currently, data masking techniques exist to allow a memory device to mask certain data during write accesses so that data of a burst length less than the burst length setting in the mode register is actually written to the memory device. However, these data masking techniques do not support read accesses of different burst lengths, nor do they support accesses having burst lengths greater than that specified in the mode register. Additionally, these data masking techniques often specify which data to mask by using additional pins on the memory device, which may be undesirable in some contexts.

SUMMARY

Various embodiments of a memory device may be implemented to respond to one or more command encodings that specify different burst lengths than the burst length indicated by the current burst length setting for the memory device. In one embodiment, a memory device may include a memory array and a mode register configured to store a value indicating a current burst length. The memory array may be configured to perform a first burst access having a first burst length in response to receiving a first command encoding and to perform a second burst access having a second burst length in response to receiving a second command encoding. The second burst length does not equal the current burst length.

Various embodiments of a memory controller may be implemented to generate one or more command encodings that specify different burst lengths than the burst length indicated by the current burst length setting for a targeted memory device. For example, in one embodiment, a memory controller may include an address signal generator configured to generate address signals in response to a memory access request and a command encoder. In response to a memory access request, the command encoder may be configured to generate a first command encoding if a burst access requested by the memory access request has a first burst length. If the burst access requested by the memory access request has a second burst length, the command encoder may be configured to generate a second command encoding. The command encoder may be configured to generate both the first command encoding and the second command encoding when a burst length setting for a memory device targeted by the memory access request has a first value, and thus at least one of the command encodings specifies a burst length other than that indicated by the memory device's current burst length setting.

A system may include a memory controller and a memory device. The memory controller may be configured to generate a first command encoding in response to receiving a first memory access request having a first burst length and to generate a second command encoding in response to receiving a second memory access request having a second burst length. The memory device may be configured to perform a first burst access having the first burst length in response to receiving the first command encoding and to perform a second burst access having the second burst length in response to receiving the second command encoding. The second burst length is different than a current burst length indicated by the burst length setting for the memory device.

One embodiment of a method may involve receiving a request for a memory device to perform a burst access having a burst length. If the burst length is a first burst length indicated by a current burst length setting of the memory device, a first command encoding may be provided to the memory device. If the burst length is a second burst length that is not equal to the first burst length indicated by the burst length setting, a second command encoding may be provided to the memory device. The memory device performs the burst access having the first burst length in response to the first command encoding and performs the burst access having the second burst length in response to the second command encoding.

In some embodiments, a memory device may include a memory array and a mode register configured to store a value indicating a current burst length. The memory array may be configured to receive an encoded command that identifies a burst length. In response to receiving the encoded command, the memory array is configured to perform a burst access having the burst length identified by the encoded command. The burst length identified by the encoded command is different than the current burst length.

BRIEF DESCRIPTION OF THE DRAWINGS

A better understanding of the present invention can be obtained when the following detailed description is considered in conjunction with the following drawings, in which.

Figure 1:
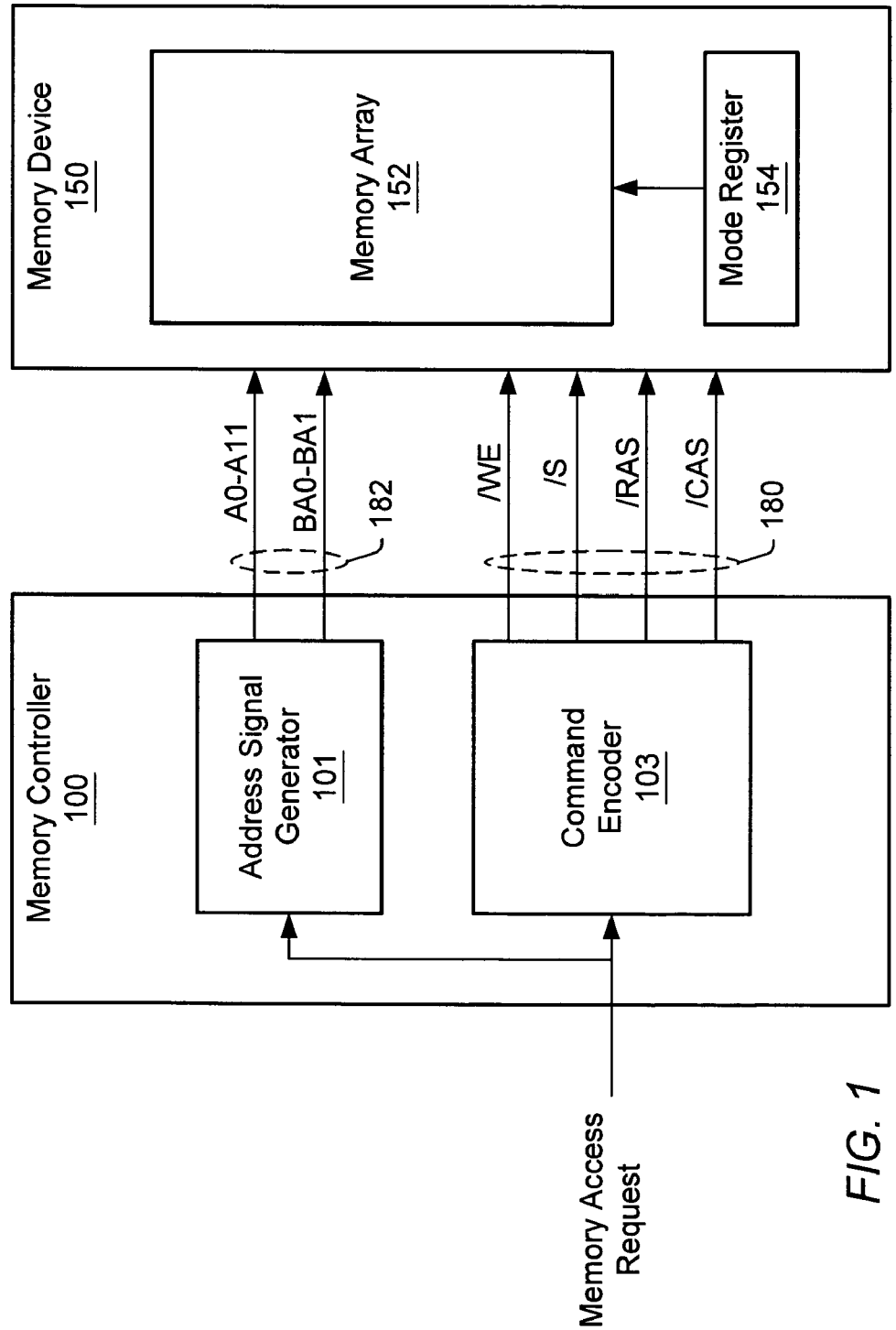
FIG. 1 illustrates one embodiment of memory system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one embodiment of a memory system 50 that includes a memory controller 100 and a memory device 150. Memory controller 100 is configured to generate one or more different command encodings instructing memory device 150 to perform accesses having burst lengths other than the burst lengths specified in a mode register 154. Memory device 150 is configured to respond to the different command encodings by performing accesses having the burst lengths specified in the command encodings, regardless of the burst length specified in the mode register 154.

Memory device 150 may be a DRAM (Dynamic Random Access Memory) device such as DDR DRAM (Double Data Rate DRAM), SDRAM (Synchronous DRAM), VDRAM (Video DRAM), RDRAM (Rambus DRAM), FCRAM (Fast Cycle RAM), etc. Memory device 150 may include multiple memory modules (e.g., SIMMs or DIMMs). Memory device 150 may include many memory elements in a memory array 152 that store data values. Each memory element may store one or more bits of data. Read and write accesses are performed on data values stored in the memory array 152.

When memory controller 100 receives a memory access request from a device (e.g., a CPU or graphics controller) across a system bus, it decodes the request and converts the system bus address to the appropriate memory address for the memory device 150. The system bus address may be converted into the appropriate address for the memory device (e.g., an address that specifies a bank and/or column) by an address signal generator 101 and the appropriate command encoding indicating the type of access to be performed may be generated by a command encoder 103. The memory controller 100 supplies the appropriate address to the memory device 150 through memory address signals 182. In the illustrated embodiment, there are two sets of address signals: BA0–BA1 and A0–A1. Note that other embodiments may use different sets of and numbers of address signals. The memory controller 100 also provides the appropriate command encoding to the memory device to indicate what type of operation(s) should be performed at the specified addresses. Different command encodings are specified using different values of a set of control signals 180. In the illustrated embodiment, the memory controller 100 controls the values of at least four active-low control signals: /S (chip select), /CAS (column address strobe), /RAS (row address strobe), and /WE (write enable) in order to generate the appropriate command encodings (note that other control signal values may also be controlled).

Accesses may be initiated by the memory controller 100 providing an active command encoding to the memory device 150 via control signals 182. An active command may open (or activates) a page (e.g., a row) in a particular bank for a subsequent access. The memory controller 100 provides address signals 182 to the memory device 150 indicating which bank and page to activate. For example, the value of the BA0 and BA1 signals may select the bank, and the values of signals A0–A11 may select the page. The activated page remains active (or open) for accesses until a precharge command encoding is issued to that bank. A precharge command encoding is also issued before opening a different page in the same bank.

After a page is opened, a read or write command encoding may be provided to the memory device 150. A read command may be used to initiate a burst read access to an active page. The memory controller 100 may provide certain values of address signals 182 with the read command in order to identify which data to output. For example, the value of the BA0 and BA1 inputs may select the bank to access, and the address provided on inputs A0–A11 may select the starting location within the page (e.g., a column) for a burst read. Several different read command encodings requesting burst reads of different burst lengths may be provided.

The memory controller 100 may generate values of command signals 180 to specify a write command in order to initiate write access to an active page. Another set of address values may be provided with the write command in order to select the data to be written. For example, the value of the BA0 and BA1 inputs may select the bank to access, and the address provided on inputs A0–A11 may select the starting column location for a burst write. Several different write command encodings specifying different burst lengths may be provided.

Burst accesses start at a selected location and continue for a programmed or requested (as indicated by the particular command encoding of a read or write command) number of bursts. A burst sequence may be programmed to follow either a serial-burst sequence or an interleaved-burst sequence. Conventional DRAMs may be programmed to read or write a burst of one, two, four, eight, or more bits. DRAMs also typically support pipelining, which allows the DRAMs to accept address and control signals for a memory transaction while performing a previous memory request.

A mode register 154 included in memory device 150 may be used to define the specific mode of operation of the memory device. As mentioned previously, the mode register 154 may allow the selection of a burst length setting. Additionally, the mode register 154 may allow the selection of a burst type (sequential or interleaved), a CAS latency, and an operating mode. Thus, the mode register 154 settings may control how memory array 152 performs accesses.

The mode register 154 may be programmed by memory controller 100 providing a mode register set command to memory device 150. Values of the address signals 182 provided to the memory device 150 with the mode register set command may indicate a new value to store in the mode register 154. For example, address bits A0–A2 may be used to specify the burst length when programming the mode register 154. The burst length specified in the mode register 154 determines the maximum number of column locations accessible during a typical read or write command. In one embodiment, burst lengths of 2, 4, or 8 column locations may be specified for both sequential and interleaved burst types. The mode register 154 may be loaded with a new value when all banks are idle and no bursts are currently in progress. After programming the mode register 154, the memory controller 100 may be required to wait for a specified time before initiating any subsequent operations.

In order to allow accesses of different burst lengths to be performed without having to change the mode register settings, memory device 150 may be configured to perform burst accesses of different burst lengths in response to different command encodings. Each command encoding is generated as a specific set of control signal values and indicates both a type of access to perform and a burst length. The command encodings may be selected from unused combinations of existing control signal values (e.g., values of S, CAS, RAS, and WE) in many embodiments so that another pin does not need to be added to memory device 150. Memory device 150 may be configured to differentiate between the different command encodings and to respond to each different command encodings by performing an access of the specified burst length. One command encoding may indicate that the requested burst length should be determined by the burst length setting in the mode register 154.

Table 1 shows a list of some of the command encodings that may be provided to memory device 150 by memory controller 100 in one embodiment. ADDR includes address signals BA0–BA1 and A0–A11.

TABLE 1

Command Encodings

| NAME (Function) | S | RAS | CAS | WE | ADDR |
|---|---|---|---|---|---|
| ACTIVE (Select bank and activate row) | L | L | H | H | Bank/Row |
| READ (Burst length = 8) (Select bank & column, start READ burst) | L | H | H | L | Bank/Col |
| READ (Burst length = mode register burst length) (Select bank & column, start READ burst) | L | H | L | H | Bank/Col |
| WRITE (Select bank & column, start WRITE burst) | L | H | L | L | Bank/Col |
| Mode Register Set | L | L | L | L | Opcode |

As shown in Table 1, an embodiment of a memory system may support two different read command encodings. One read command encoding may specify a specific burst length (8) while the other encoding may indicate that the burst length specified in the mode register 154 should be used. In an alternative embodiment, the second encoding may indicate that a specific burst length (e.g., 4) should be used. Note that in this embodiment, these command encodings may be specified without using additional control signals or additional address signals. Also note that the memory device 150 performs burst accesses having the burst lengths specified in each command encoding without data masking. This embodiment may be implemented for DDR II DRAM. For example, the read command encoding specifying a burst length of 8 may be the command encoding used to specify a burst terminate command in DDR I.

Memory controller 100 may be configured to receive burst requests of different lengths from different devices. Depending on the burst length of a request, the memory controller 100 may select which command encoding to provide to the memory device 150. For example, AGP (Advanced Graphics Port) transactions initiated by a graphics controller (e.g., graphics controller 408 in FIG. 4) may involve four bursts at a time, while processor transactions may involve eight bursts. If a processor (e.g., CPU 10 in FIG. 4) initiates a transaction, the memory controller 100 may output a command encoding requesting eight bursts from the memory device. If instead the graphics controller initiates a transaction, the memory controller 100 may output a different command encoding that requests four bursts from the memory device. The memory device 150 may respond by outputting the number of bursts requested in each command encoding, regardless of the current burst length setting in the mode register 154.

In some embodiments, the burst length setting of the mode register 154 may determine which different command encodings may be generated by the memory controller 100. Some command encodings may be used when the burst length setting has one value but may not be used if the burst length setting has another value. For example, in one embodiment, different command encodings may be used to specify burst lengths greater than and equal to the current burst length setting. Accordingly, in that embodiment, if the current burst length setting has a maximum value, only one command encoding, which indicates a burst length equal to the current burst length setting or which indicates that the current burst length setting should be used, may be provided to the memory device.

Note that in alternative embodiments, all of the different command encodings may be provided to the memory device, regardless of the current burst length setting in the mode register. In some of these embodiments, each command encoding may indicate a particular burst length (as opposed to one or more command encodings indicating that the current burst length setting should be used). Note that in some embodiments, each command encoding used to initiate a burst access may specify the burst length of the requested access. In such embodiments, the burst length setting in the mode register may be irrelevant since each command encoding specifies a particular burst length. Accordingly, some embodiments of a memory device may not provide a burst length setting in the mode register.

In some embodiments, different command encodings may be available for both reads and writes. In other embodiments, one command encoding (indicating that the current burst mode register setting should be used) may be provided for writes and several command encodings (each specifying a different burst length or that the current burst mode register setting should be used) may be provided for reads (or vice versa).

Figure 2A:
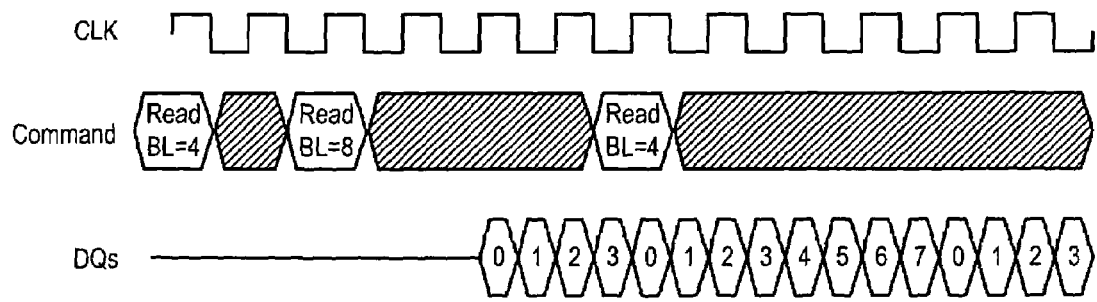
FIGS. 2A–2C show timing diagrams illustrating the operation of one embodiment of a memory system.
Figure 2B:
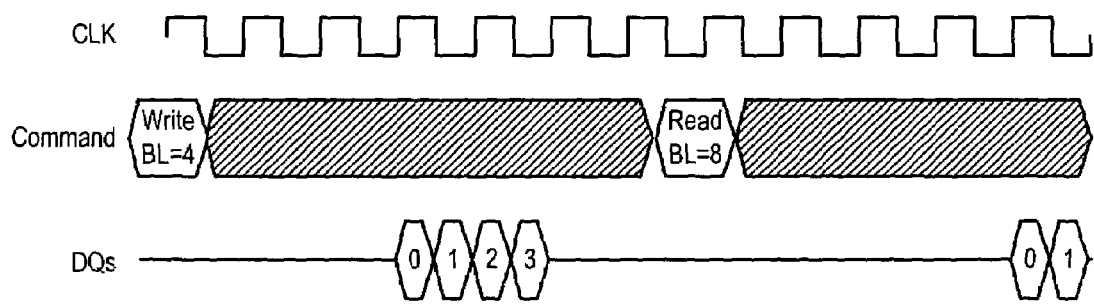
Figure 2C:
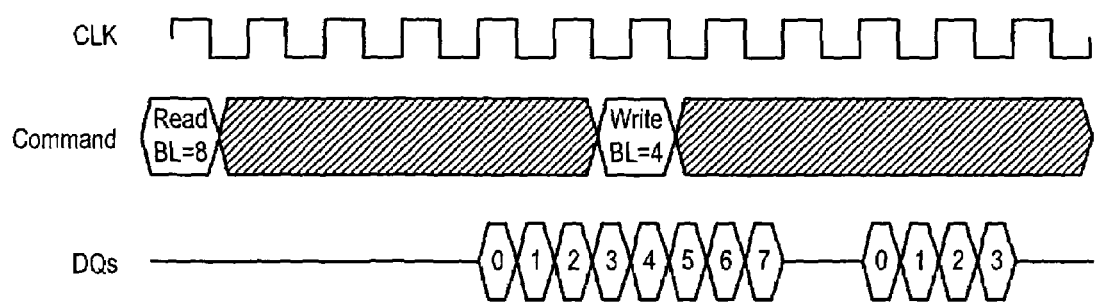

In one embodiment, an extra command pin may be added to the memory device 150 so that an additional command line (e.g., in addition to S, RAS, CAS, and WE) may be used to define additional command encodings (e.g., specifying different types of accesses (e.g., read or write) or specifying additional burst lengths). In one such embodiment, command encodings may be used to specify burst lengths of two, four, FIGS. 2A–2C show exemplary timing waveforms that may be generated in one embodiment of a memory system. In these examples, CL (CAS Latency)=4, AL (Active Latency)=0, RL (Read Latency)=4, and WL (Write Latency)=3. In these examples, the burst length setting in the mode register is assumed to be set equal to 4 throughout each example. For example, in FIG. 2A, the burst length setting of the mode register is not modified between the times that the BL=4 read command and the BL=8 read command are performed, nor is it modified between the times that the BL=8 read command and the BL=4 command are performed.

FIG. 2A illustrates performance of a BL (Burst Length)=4 read command followed by a BL=8 read command and another BL=4 read command. In this example, the BL=4 read commands may be initiated by providing a command encoding indicating that the current burst length setting should be used to the memory device. The BL=8 read command may be initiated by providing a command encoding indicating that a burst access having a length of 8 (regardless of the current burst length setting) should be used. As this example shows, the memory device may respond to the commands by outputting a continuous stream of data, performing one access as soon as the previous access has completed. Note also that each access is performed in a number of cycles corresponding to the requested number of burst (e.g., performance of a BL=4 command does not require more than 2 clock cycles). FIG. 2B shows performance of a BL=4 write command followed by a BL=8 read command. FIG. 2C illustrates performance of a BL= 8 read command followed by a BL=4 write command.

Figure 3:
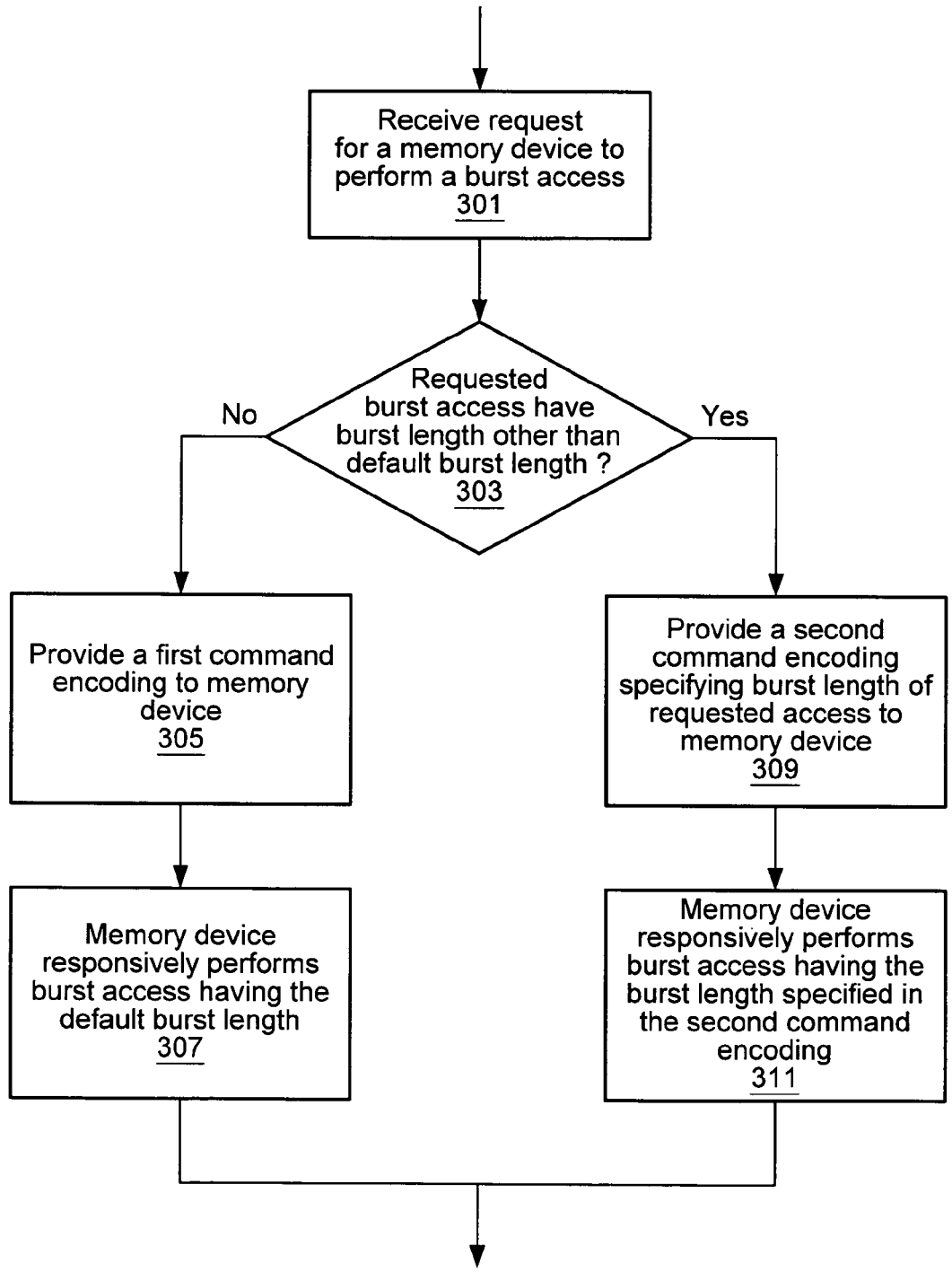
FIG. 3 is a flowchart of one embodiment of a method of operating a memory system.

FIG. 3 shows one embodiment of a method of operating a memory system. In this embodiment, a request for a memory device to perform a burst access having a particular burst length is received at 301. If the requested burst length is the same as the current burst length setting of the memory device (e.g., as specified in a burst mode register), a first command encoding may be provided to the memory device, as indicated at 303–305. The first command encoding may indicate that a current burst length setting should be used. Alternatively, the first command encoding may specifically indicate the burst length of the burst access to be performed by specifying a burst length that is the same as the current burst length setting. In response to receiving the first command encoding, the memory device performs a burst access having the requested burst length, as shown at 309.

If the requested burst length is not the same as the current burst length setting of the memory device, a second command encoding may be provided to the memory device, as indicated at 303 and 309. The second command encoding differs from the first command encoding by a value of at least one control signal. The second command encoding indicates that a burst access having a specific burst length, which differs from the burst length indicated by the current burst length setting, should be performed. In response to the second command encoding, the memory device performs a burst access having the burst length specified by the second command encoding, as indicated at 311. The first and second command encoding may both be used to specify the same type of access (e.g., read access). Additional command encodings may be used to perform accesses having burst lengths different from that specified in the first and second command encodings and/or to perform accesses of a different type than that specified in the first and second command encodings.

Figure 4:
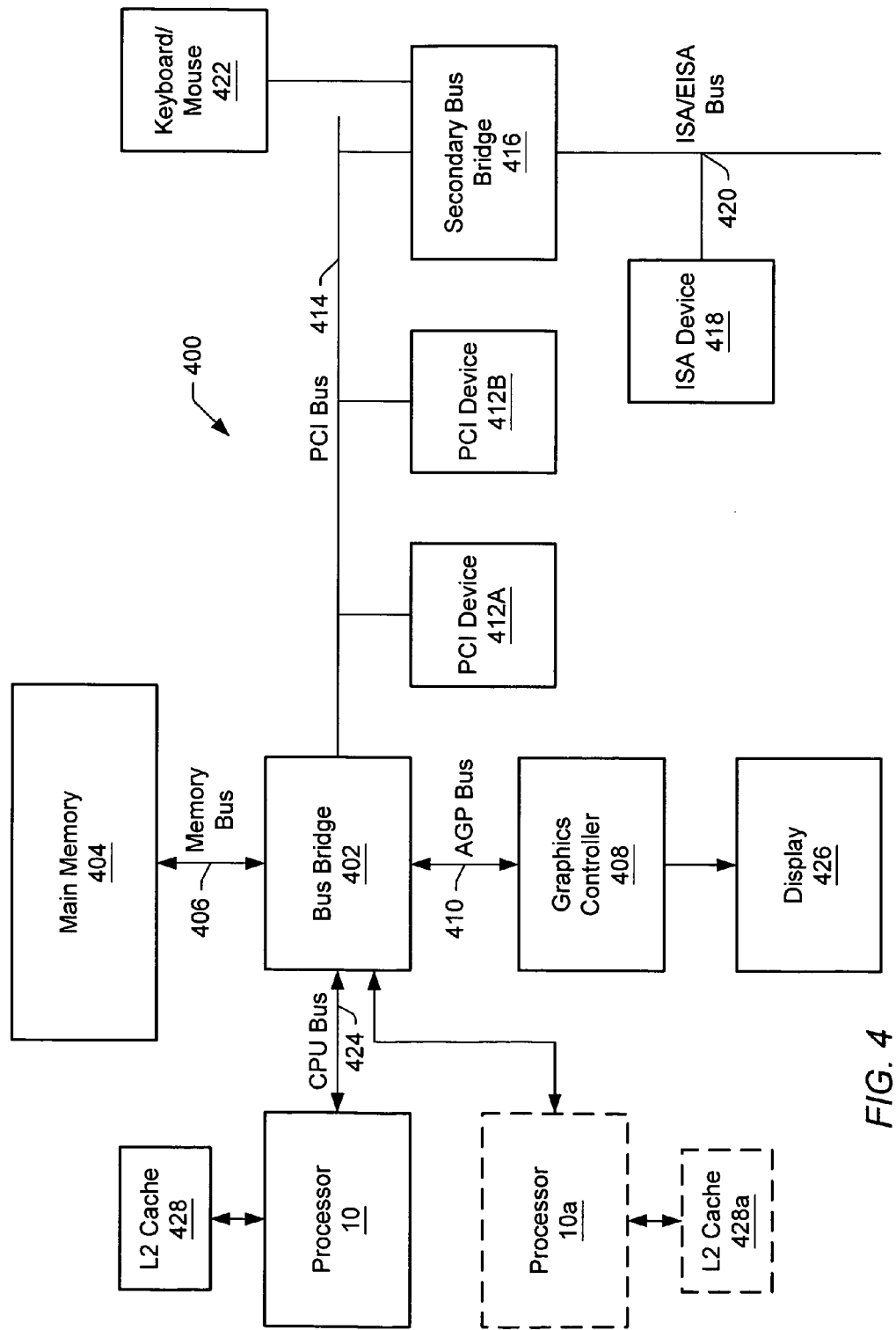
FIGS. 4–5 are block diagrams of embodiments of computer systems that may include an embodiment of a memory system like those shown in FIG. 1.

FIG. 4 shows a block diagram of one embodiment of a computer system 400 that includes a processor 10 coupled to a variety of system components through a bus bridge 402. Computer system 400 may include an embodiment of a memory system like the ones illustrated in FIGS. 1–2. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 10 is coupled to bus bridge 402 through a CPU bus 424 and to an optional L2 cache 428. In some embodiments, the processor 10 may include an integrated L1 cache (not shown). Processor 10 may also include an embodiment of a memory controller 100 in some embodiments.

Bus bridge 402 provides an interface between processor 10, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus. In one embodiment, bus bridge 402 may include an embodiment of a memory controller 100 as described above.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 10 and bus bridge 402 in other embodiments. Alternatively, the external cache may be coupled to bus bridge 402 and cache control logic for the external cache may be integrated into bus bridge 402. L2 cache 428 is shown in a backside configuration to processor 10. It is noted that L2 cache 428 may be separate from processor 10, integrated into a cartridge (e.g., slot 1 or slot A) with processor 10, or even integrated onto a semiconductor substrate with processor 10.

Main memory 404 is a memory in which application programs are stored and from which processor 10 primarily executes. A suitable main memory 404 comprises DRAM (Dynamic Random Access Memory). For example, a plurality of banks of SDRAM (Synchronous DRAM) or Rambus DRAM (RDRAM) may be suitable. Main memory device 404 may be configured to respond to different command encodings specifying burst lengths other than a burst length indicated by a current burst length setting.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

Figure 5:
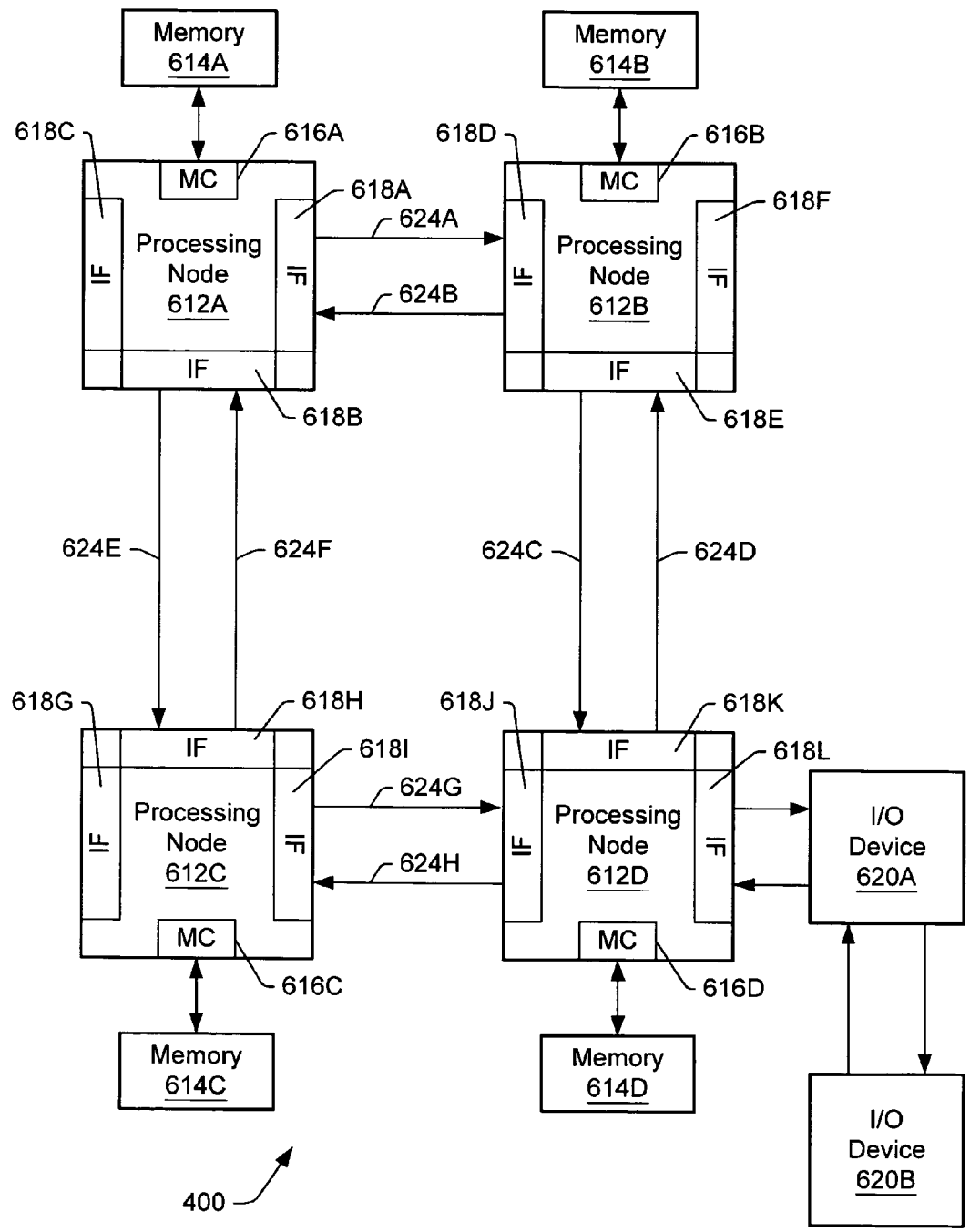

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 10a shown as an optional component of computer system 400). Processor 10a may be similar to processor 10. More particularly, processor 10a may be an identical copy of processor 10. Processor 10a may be connected to bus bridge 402 via an independent bus (as shown in FIG. 5) or may share CPU bus 224 with processor 10. Furthermore, processor 10a may be coupled to an optional L2 cache 428a similar to L2 cache 428.

Turning now to FIG. 5, another embodiment of a computer system 400 that may include a memory system as described above is shown. Other embodiments are possible and contemplated. In the embodiment of FIG. 5, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 5. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 5. Any suitable routing algorithm may be used. Other embodiments of computer system 400 may include more or fewer processing nodes then the embodiment shown in FIG. 5.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more processors. Broadly speaking, a processing node includes at least one processor and may optionally include a memory controller for communicating with a memory and other logic as desired. More particularly, each processing node 612A–612D may include one or more copies of processor 10. External interface unit 18 may includes the interface logic 618 within the node, as well as the memory controller 616. Each memory controller 616 may include an embodiment of memory controller 100, as described above.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicating with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A memory device comprising:
   a mode register configured to store a value indicating a current burst length; and
   a memory array;
   wherein the memory array is configured to perform a first burst access having a first burst length in response to receiving a first command encoding; and
   wherein the memory array is configured to perform a second burst access having a second burst length in response to receiving a second command encoding, wherein the second burst length does not equal the current burst length, and wherein the second burst length does not equal the first burst length.

2. The memory device of claim 1, wherein the second burst length is greater than the current burst length.

3. The memory device of claim 1, wherein the memory array is configured to perform a read access in response to both the first command encoding and the second command encoding.

4. The memory device of claim 3, wherein the memory array is further configured to perform a third burst access having a first burst length in response to receiving a third command encoding, wherein the third burst length equals the current burst length, and wherein the third burst access is a write burst access.

5. The memory device of claim 4, wherein the memory array is further configured to perform a fourth burst access having a fourth burst length in response to receiving a fourth command encoding, wherein the fourth burst length does not equal the current burst length, and wherein the fourth burst access is a write burst access.

6. The memory device of claim 1, wherein the memory device is a DDR (double data rate) II DRAM (dynamic random access memory) device.

7. The memory device of claim 1, wherein the first command encoding and the second command encoding are both received as values of a chip select signal, a column address strobe signal, a row address strobe signal, and a write enable signal.

8. The memory device of claim 1, wherein the memory array is not configured to respond to the second command encoding if the value stored in the mode register indicates a maximum burst length.

9. The memory device of claim 1, wherein the memory array is configured to perform a third burst access having a third burst length in response to receiving a third command encoding, wherein the third burst length does not equal the current burst length, and wherein the third burst length does not equal the second burst length.

10. A memory controller comprising:
    an address signal generator configured to generate address signals in response to a memory access request; and
    a command encoder, wherein in response to the memory access request, the command encoder is configured to generate a first command encoding if a burst access requested by the memory access request has a first burst length and to generate a second command encoding if the burst access requested by the memory access request has a second burst length, wherein the command encoder is configured to generate both the first command encoding and the second command encoding when a burst length setting for a memory device targeted by the memory access request has a first value.

11. A system comprising:
    a memory controller configured to generate a first command encoding in response to receiving a first memory access request having a first burst length and to generate a second command encoding in response to receiving a second memory access request having a second burst length; and
    a memory device coupled to the memory controller and configured to perform a first burst access having the first burst length in response to receiving the first command encoding and to perform a second burst access having the second burst length in response to receiving the second command encoding, wherein the second burst length is different than a current burst length indicated by a burst length setting for the memory device.

12. The system of claim 11, wherein the second burst length is greater than the current burst length.

13. The system of claim 11, wherein the memory device is configured to perform a read access in response to both the first command encoding and the second command encoding.

14. The system of claim 13, wherein the memory device is further configured to perform a third burst access having a first burst length in response to receiving a third command encoding, wherein the third burst length equals the current burst length, and wherein the third burst access is a write burst access.

15. The system of claim 14, wherein the memory device is further configured to perform a fourth burst access having a fourth burst length in response to receiving a fourth command encoding, wherein the fourth burst length does not equal the current burst length, and wherein the fourth burst access is a write burst access.

16. The system of claim 11, wherein the memory device is a DDR (double data rate) II DRAM (dynamic random access memory) device.

17. The system of claim 11, wherein the first command encoding and the second command encoding are both encoded as values of a chip select signal, a column address strobe signal, a row address strobe signal, and a write enable signal.

18. The system of claim 11, wherein the memory device is not configured to respond to the second command encoding if the current burst length of the memory device is a maximum burst length.

19. The system of claim 11, wherein the memory device is configured to perform a third burst access having a third burst length in response to receiving a third command encoding, wherein the third burst length does not equal the current burst length, and wherein the third burst length does not equal the second burst length.

20. A method comprising:
    receiving a request for a memory device to perform a burst access having a burst length;
    if the burst length is a first burst length indicated by a current burst length setting of the memory device, providing a first command encoding to the memory device; and
    if the burst length is a second burst length that is not equal to the first burst length indicated by the burst length setting, providing a second command encoding to the memory device;

the memory device performing the burst access having the first burst length in response to the first command encoding;

the memory device performing the burst access having the second burst length in response to the second command encoding.

21. The method of claim 20, wherein the second burst length is greater than the first burst length.

22. The method of claim 20, wherein the burst access is a read access.

23. The method of claim 22, further comprising:
receiving a request for the memory device to perform a second burst access having a third burst length;
providing a third command encoding to the memory device if the third burst length is not equal to the first burst length indicated by the burst length setting; and
the memory device performing the second burst access having the third burst length in response to the third command encoding, wherein the second burst access is a write burst access.

24. The method of claim 23, further comprising providing a fourth command encoding to the memory device if the third burst length equals the first burst length indicated by the burst length setting.

25. The method of claim 20, wherein the memory device is a DDR (double data rate) II DRAM (dynamic random access memory) device.

26. The method of claim 20, wherein said providing the first command encoding comprising controlling values of a chip select signal, a column address strobe signal, a row address strobe signal, and a write enable signal, and wherein said providing the second command encoding comprises controlling the values of the chip select signal, the column address strobe signal, the row address strobe signal, and the write enable signal.

27. The method of claim 20, further comprising performing a third command encoding to the memory device if the burst length is a third burst length and the memory device perform the burst access having the third burst length in response to receiving the third command encoding.

28. A memory device comprising:
a mode register configured to store a value indicating a current burst length; and
a memory array;
wherein the memory array is configured to receive an encoded command, wherein the encoded command identifies a burst length;
wherein in response to receiving the encoded command, the memory array is configured to perform a burst access having the burst length identified by the encoded command, wherein the burst length is different than the current burst length.

29. The memory device of claim 28, wherein the burst length is greater than the current burst length.

30. The memory device of claim 28, wherein the memory array is configured to receive a second encoded command identifying a second burst length and to responsively perform a second burst access having the second burst length, wherein the second burst length is different than the burst length, and wherein the memory array is configured to perform a read access in response to both the encoded command and the second encoded command.

31. The memory device of claim 30, wherein the memory array is further configured to perform a third burst access having the current burst length in response to receiving a third encoded command, wherein the third burst access is a write burst access.

32. The memory device of claim 31, wherein the memory array is further configured to perform a fourth burst access having a fourth burst length in response to receiving a fourth encoded command identifying the fourth burst length, wherein the fourth burst length does not equal the current burst length, and wherein the fourth burst access is a write burst access.

33. The memory device of claim 28, wherein the memory device is a DDR (double data rate) II DRAM (dynamic random access memory) device.

34. The memory device of claim 28, wherein the encoded command is received as values of a chip select signal, a column address strobe signal, a row address strobe signal, and a write enable signal.

35. The memory device of claim 28, wherein the memory array is not configured to respond to the encoded command if the value stored in the mode register indicates a maximum burst length.

36. The memory device of claim 28, wherein the memory array is configured to perform a second burst access having a second burst length in response to receiving a second encoded command identifying the second burst length, and wherein the second burst length is equal to the current burst length.

37. A system comprising:
a memory controller configured to generate a first command encoding in response to receiving a first memory access request having a first burst length and to generate a second command encoding in response to receiving a second memory access request having a second burst length, wherein the first command encoding identifies the first burst length and the second command encoding identifies the second burst length; and
a memory device coupled to the memory controller and configured to perform a first burst access having the first burst length in response to receiving the first command encoding and to perform a second burst access having the second burst length in response to receiving the second command encoding.

* * * * *

UNITED STATES PATENT AND TRADEMARK OFFICE
CERTIFICATE OF CORRECTION

PATENT NO.        : 6,957,308 B1                                     Page 1 of 1
APPLICATION NO.   : 10/193828
DATED             : October 18, 2005
INVENTOR(S)       : Shwetal Patel It is certified that error appears in the above-identified patent and that said Letters Patent is hereby corrected as shown below:

In the Claims:

Column 11, Claim 4, Line 31, delete "a first burst" and substitute -- a third burst --.

Column 12, Claim 14, Line 29, delete "a first burst" and substitute -- a third burst --.

Signed and Sealed this
Fourteenth Day of April, 2015

Michelle K. Lee
*Director of the United States Patent and Trademark Office*